United States Patent
Manabe et al.

(10) Patent No.: US 6,803,749 B2
(45) Date of Patent: Oct. 12, 2004

(54) POWER SUPPLY SYSTEM AND PROCESS INCLUDING SUB-SWITCHING ELEMENT CONTROL

(75) Inventors: Kouji Manabe, Kanagawa (JP); Yoshihiro Mitsumoto, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/337,735

(22) Filed: Jan. 8, 2003

(65) Prior Publication Data

US 2003/0133240 A1 Jul. 17, 2003

(30) Foreign Application Priority Data

Jan. 11, 2002 (JP) .................................. 2002-005118

(51) Int. Cl.⁷ .......................... G05F 1/652; G05F 1/44
(52) U.S. Cl. ...................................... 323/222; 323/284
(58) Field of Search ................................ 323/222, 282, 323/284, 285, 286

(56) References Cited

U.S. PATENT DOCUMENTS

| | | | |
|---|---|---|---|
| 6,037,755 A | | 3/2000 | Mao et al. |
| 6,580,258 B2 | * | 6/2003 | Wilcox et al. .............. 323/282 |
| 6,600,298 B2 | * | 7/2003 | McDonald et al. ......... 323/271 |
| 6,603,671 B2 | * | 8/2003 | Tokunaga et al. ............. 363/17 |
| 6,621,257 B2 | * | 9/2003 | Mitamura et al. .......... 323/282 |
| 6,642,697 B2 | * | 11/2003 | Zuniga et al. .............. 323/223 |
| 6,650,098 B2 | * | 11/2003 | Dubhashi et al. ........... 323/282 |

FOREIGN PATENT DOCUMENTS

EP           1 033 804 A2      9/2000

OTHER PUBLICATIONS

"Automotive electronics power up" of IEEE Spectrum, May 2000.

J.G. Kassakian et al., "Carmakers Turn to a Higher System Voltage to Feed Increasing Numbers of Power–Hungry Automotive Features, Gadgets, and Gizmos: Automotive electronics power up", XP–001030270, IEEE SPECTRUM, vol. 37, No. 5, May. 2000, pp. 34–39.

Bigorra et al., "Dual–voltage power networks: Lear Automotive EEDS has developed an innovative electrical and electronic architecture to handle future high–power requirements in vehicles", XP–00959225, Automotive Engineering, vol. 108, No. 9, Sep. 2000, pp. 113–116.

I.A. Khan, "Power Electronics in Automotive Electrical Systems", Power Electronics in Transportation, Oct. 24, 1996, IEEE, pp. 29–36.

* cited by examiner

Primary Examiner—Bao Q. Vu
(74) Attorney, Agent, or Firm—McDermott Will & Emery LLP (57) ABSTRACT

A power supply system includes: a high voltage power supply; a main power supply wire; a step down circuit inputting a power having a high voltage and outputting a power having a lowered voltage; a sub-power supply wire; a voltage sensor for sensing a voltage of the power outputted from the step down circuit; a sub-switching element disposed on the sub-power supply wire; and a controller for controlling the sub-switching element. The controller turns off the sub-switching element, when the voltage sensed with the voltage sensor is equal to or higher than a first predetermined voltage defined lower than the lowered voltage. Moreover, the controller drives the sub-switching element in duty control for stepping down the power having the high voltage to the power having the lowered voltage outputted from the step down circuit, when the voltage sensed with the voltage sensor is lower than the first predetermined voltage.

20 Claims, 9 Drawing Sheets

POWER SUPPLY SYSTEM AND PROCESS INCLUDING SUB-SWITCHING ELEMENT CONTROL

BACKGROUND OF THE INVENTION

The present invention relates to a power supply system which steps down a power having a high voltage.

A multi-voltage power supply system having a high voltage system and a low voltage system is proposed recently for a vehicle.

"Automotive electronics power up" of IEEE SPECTRUM, May 2000 discloses a multi-voltage power supply system for a vehicle.

SUMMARY OF THE INVENTION

It is an object of the present invention to provide a multi-voltage power supply system for stepping down a power having a high voltage.

It is another object of the present invention to allow the multi-voltage power supply system to supply a power (having a properly lowered voltage) to a low voltage load, even when a low voltage transistor is in failure, thus saving the need of a low voltage battery.

According to a first aspect of the present invention, there is provided a power supply system comprising:

1) a high voltage power supply for supplying a power having a high voltage;
2) a main power supply wire connecting to the high voltage power supply;
3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a first predetermined voltage being defined lower than the lowered voltage stepped down by the step down circuit;
4) a sub-power supply wire connecting the high voltage power supply to an output side of the step down circuit;
5) a voltage sensor for sensing a voltage of the power outputted from the step down circuit;
6) a sub-switching element disposed on the sub-power supply wire; and
7) a controller for controlling the sub-switching element,
   a) the controller turning off the sub-switching element, when the voltage sensed with the voltage sensor is equal to or higher than the first predetermined voltage; and
   b) the controller driving the sub-switching element in duty control for stepping down the power having the high voltage to the power having the lowered voltage outputted from the step down circuit, when the voltage sensed with the voltage sensor is lower than the first predetermined voltage.

According to a second aspect of the present invention, there is provided a power supply process comprising:

1) supplying, from a high voltage power supply, a power having a high voltage;
2) stepping down the power having the high voltage, the stepping down operation by a step down circuit comprising the following operations:
   a) inputting, by way of a main power supply wire connecting to the high voltage power supply, the power having the high voltage,
   b) stepping down the thus inputted power having the high voltage, and
   c) outputting a power having a lowered voltage lower than the high voltage, a first predetermined voltage being defined lower than the lowered voltage thus stepped down;
3) sensing a voltage of the power outputted from the step down circuit; and
4) controlling a sub-switching element disposed on a sub-power supply wire which connects the high voltage power supply to an output side of the step down circuit, the controlling operation comprising the following operations:
   a) turning off the sub-switching element, when the voltage thus sensed is equal to or higher than the first predetermined voltage; and
   b) driving the sub-switching element in duty control for stepping down the power having the high voltage to the power having the lowered voltage outputted from the step down circuit, when the voltage thus sensed is lower than the first predetermined voltage.

According to a third aspect of the present invention, there is provided a power supply system comprising:

1) a supplying means for supplying a power having a high voltage;
2) a first connecting means connecting to the high voltage power supply;
3) a stepping down means comprising the following operations:
   a) inputting, by way of the first connecting means, the power having the high voltage,
   b) stepping down the thus inputted power having the high voltage, and
   c) outputting a power having a lowered voltage lower than the high voltage, a first predetermined voltage being defined lower than the lowered voltage stepped down by the stepping down means;
4) a second connecting means connecting the high voltage power supply to an output side of the stepping down means;
5) a sensing means for sensing a voltage of the power outputted from the stepping down means;
6) a sub-switching means disposed on the second connecting means; and
7) a controlling means for controlling the sub-switching means,
   a) the controlling means turning off the sub-switching means, when the voltage sensed with the sensing means is equal to or higher than the first predetermined voltage; and
   b) the controlling means driving the sub-switching means in duty control for stepping down the power having the high voltage to the power having the lowered voltage outputted from the stepping down means, when the voltage sensed with the sensing means is lower than the first predetermined voltage.

According to a fourth aspect of the present invention, there is provided a power supply system comprising:

1) a high voltage power supply for supplying a power having a high voltage;
2) a main power supply wire connecting to the high voltage power supply;

3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a first predetermined voltage being defined lower than the lowered voltage stepped down by the step down circuit, a second predetermined voltage being defined higher than the lowered voltage stepped down by the step down circuit;
4) a sub-power supply wire connecting the high voltage power supply to an output side of the step down circuit;
5) a voltage sensor for sensing a voltage of the power outputted from the step down circuit;
6) a main switching element disposed on the main power supply wire;
7) a sub-switching element disposed on the sub-power supply wire; and
8) a controller for controlling the main switching element and the sub-switching element,
   a) the controller turning on the main switching element while the controller turning off the sub-switching element, when the voltage sensed with the voltage sensor is in both of the following states:
      i) equal to or lower than the second predetermined voltage, and
      ii) equal to or higher than the first predetermined voltage;
   b) the controller driving the main switching element in duty control for stepping down the power having the high voltage to the power having the lowered voltage outputted from the step down circuit, when the voltage sensed with the voltage sensor is higher than the second predetermined voltage; and
   c) the controller driving the sub-switching element in duty control for stepping down the power having the high voltage to the power having the lowered voltage outputted from the step down circuit, when the voltage sensed with the voltage sensor is lower than the first predetermined voltage.

According to a fifth aspect of the present invention, there is provided a power supply system comprising:
1) a high voltage power supply for supplying a power having a high voltage;
2) a main power supply wire connecting to the high voltage power supply;
3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a first predetermined voltage being defined lower than the lowered voltage stepped down by the step down circuit, a second predetermined voltage being defined higher than the lowered voltage stepped down by the step down circuit;
4) a sub-power supply wire connecting the high voltage power supply to an output side of the step down circuit;
5) a voltage sensor for sensing a voltage of the power outputted from the step down circuit;
6) a main switching element disposed on the main power supply wire;
7) a sub-switching element disposed on the sub-power supply wire; and
8) a controller for controlling the main switching element and the sub-switching element,
   a) the controller turning on the main switching element while the controller turning off the sub-switching element, when the voltage sensed with the voltage sensor is in both of the following states:
      i) equal to or lower than the second predetermined voltage, and
      ii) equal to or higher than the first predetermined voltage; and
   b) the controller turning off the main switching element while the controller driving the sub-switching element in duty control for stepping down the power having the high voltage to the power having the lowered voltage outputted from the step down circuit, when the voltage sensed with the voltage sensor is in at least one of the following states:
      i) higher than the second predetermined voltage, and
      ii) lower than the first predetermined voltage.

According to a sixth aspect of the present invention, there is provided a power supply system comprising:
1) a high voltage power supply for supplying a power having a high voltage;
2) a main power supply wire connecting to the high voltage power supply;
3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a second predetermined voltage being defined higher than the lowered voltage stepped down by the step down circuit;
4) a voltage sensor for sensing a voltage of the power outputted from the step down circuit;
5) a main switching element disposed on the main power supply wire; and
6) a controller for controlling the main switching element, the controller driving the main switching element in duty control for stepping down the power having the high voltage to the power having the lowered voltage outputted from the step down circuit, when the voltage sensed with the voltage sensor is higher than the second predetermined voltage.

The other objects and features of the present invention will become understood from the following description with reference to the accompanying drawings.

DETAILED DESCRIPTION OF THE EMBODIMENT

In the following, various embodiments of the present invention will be described in detail with reference to the accompanying drawings.

Figure 1:
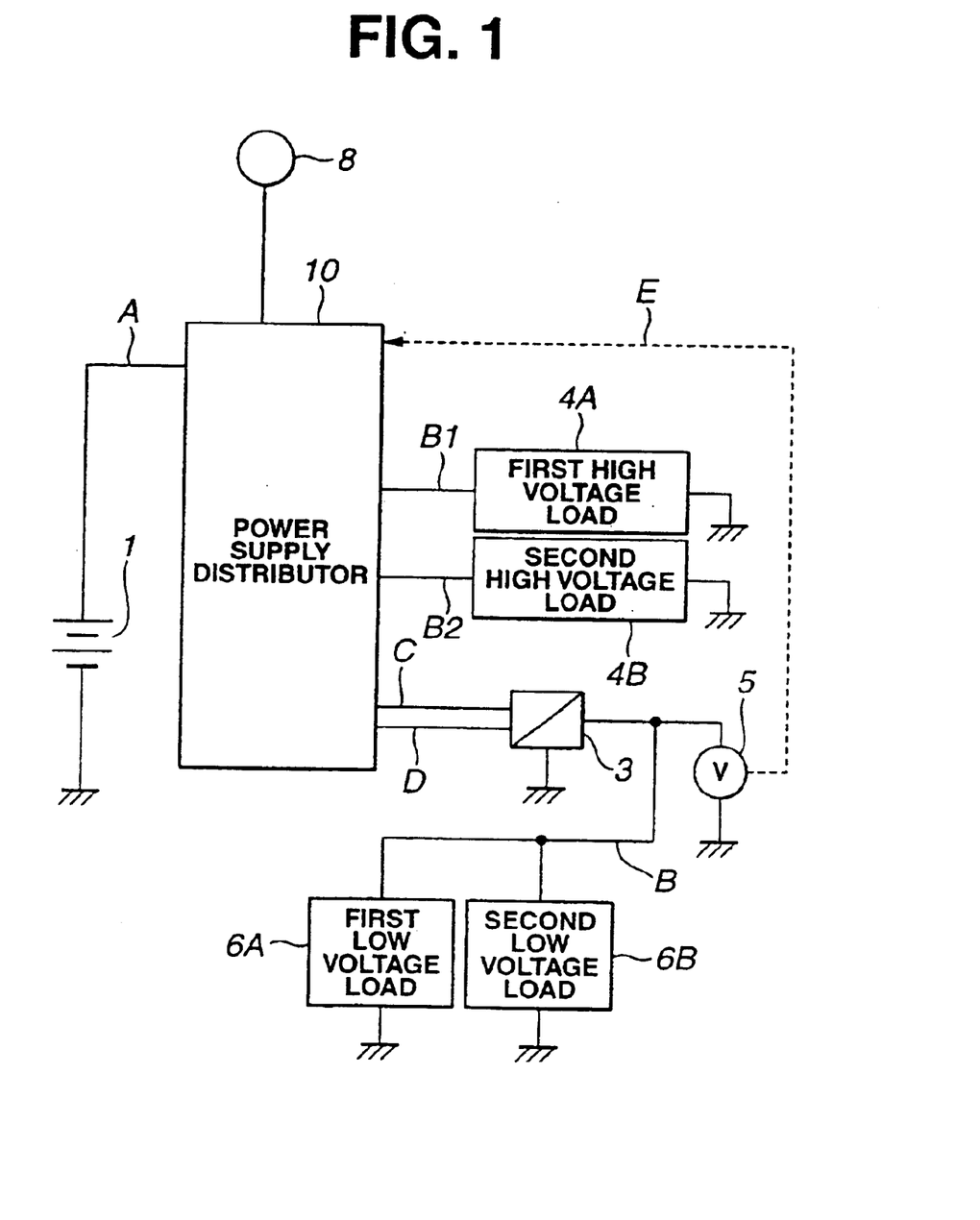
FIG. 1 is a circuit diagram showing a multi-voltage power supply system, according to a first embodiment of the present invention.

As is seen in FIG. 1, there is provided a circuit diagram showing a multi-voltage power supply system which is equipped with a high voltage system (42 V) and a low voltage system (14 V), according to a first embodiment of the present invention.

A high voltage power supply 1 has a first end (lower in FIG. 1) which is earthed, and a second end (upper in FIG. 1) which connects to a high voltage wire A. High voltage wire A connects to a power supply distributor 10. A first high voltage load 4A connects to power supply distributor 10 by way of a first output wire B1, while a second high voltage load 4B connects to power supply distributor 10 by way of a second output wire B2. Moreover, a DC-DC converter 3 connects to power supply distributor 10 by way of a main power supply wire C and a sub-power supply wire D.

DC-DC converter 3 connects to a first low voltage load 6A and a second low voltage load 6B by way of an output wire B. A voltage sensor 5 connects to output wire B, in such a manner that a sensed signal can be outputted to power supply distributor 10 by way of a signal wire E which is depicted by a broken line in FIG. 1.

According to the first embodiment of the present invention, DC-DC converter constitutes a step down circuit, while voltage sensor 5 constitutes a voltage sensing means.

Figure 2:
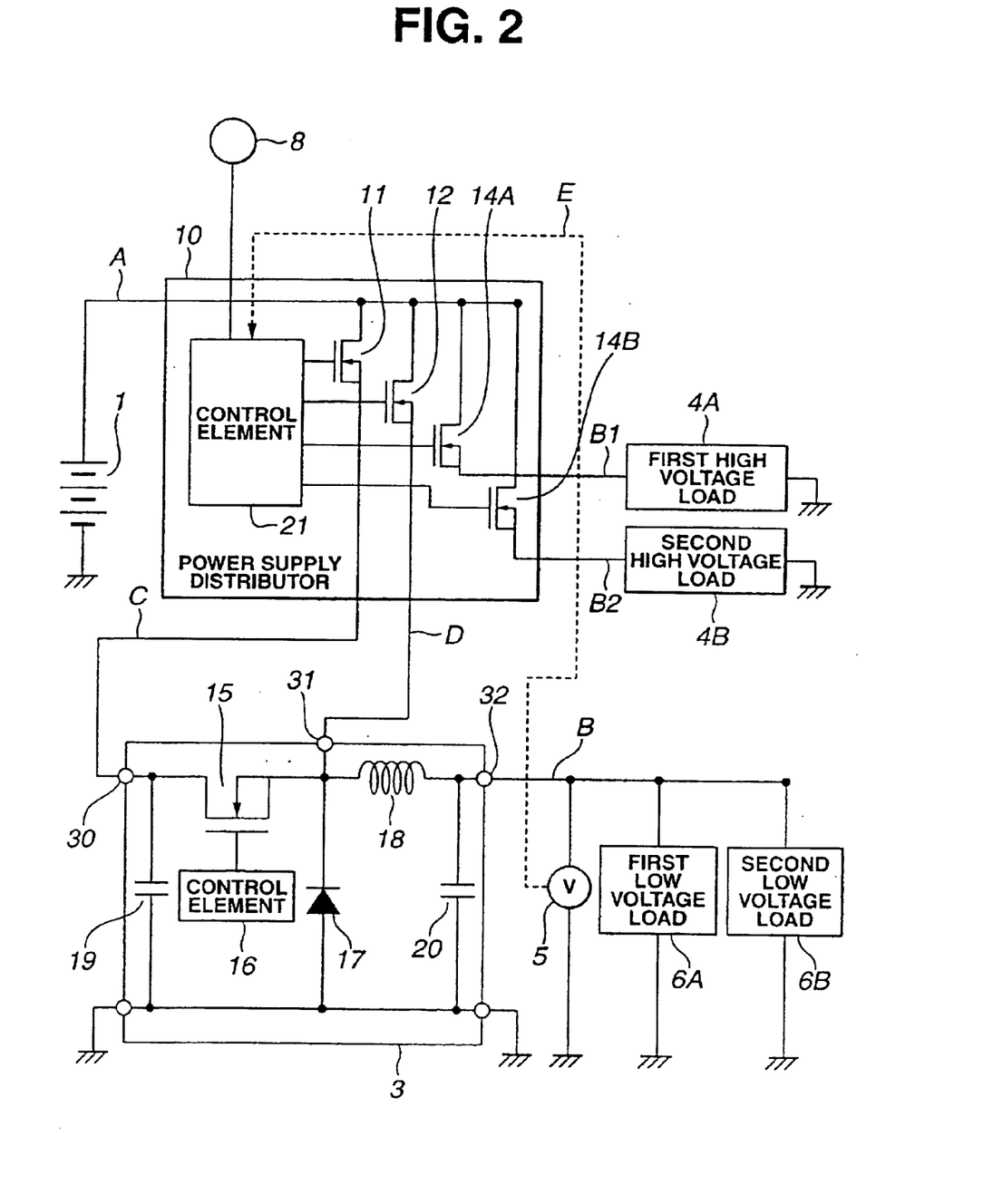
FIG. 2 shows particulars of contents of a DC-DC converter 3 and a power supply distributor 10.

FIG. 2 shows particulars of contents of DC-DC converter 3 and power supply distributor 10.

In power supply distributor 10, first output wire B1 and second output wire B2 connect to high voltage wire A. First output wire B1 is provided with a first load transistor 14A which functions as a power supply switch, while second output wire B2 is provided with a second load transistor 14B which also functions as the power supply switch.

A control element 21 controls (i.e., turns on and/or off) first load transistor 14A, to thereby supply a high voltage 42 V from high voltage power supply 1 to first high voltage load 4A and/or cut off high voltage 42V. Likewise, control element 21 controls (i.e., turns on and/or off) second load transistor 14B, to thereby supply high voltage 42 V from high voltage power supply 1 to second high voltage load 4B and/or cut off high voltage 42 V.

Moreover in power supply distributor 10, main power supply wire C and sub-power supply wire D connect to high voltage wire A. Main power supply wire C is provided with a main transistor 11 which functions as a power supply switch and is controlled with control element 21, while sub-power supply wire D is provided with a sub-transistor 12 which also functions as the power supply switch and is controlled with control element 21.

Control element 21 controls (i.e., turns on and/or off) main transistor 11, to thereby input and/or cut off a power (having high voltage 42 V) from high voltage wire A to a first input terminal 30 by way of main power supply wire C. Likewise, control element 21 controls (i.e., turns on and/or off) sub-transistor 12, to thereby input and/or cut off the power (having high voltage 42 V) from high voltage wire A to a second input terminal 31 by way of sub-power supply wire D.

According to the first embodiment of the present invention, main transistor 11 constitutes a main switching element, while sub-transistor 12 constitutes a sub-switching element.

In an ordinary operation, supply and/or cut-off of high voltage 42 V to be inputted to DC-DC converter 3 is only via first input terminal 30 with main transistor 11 controlled by control element 21.

In other words, sub-transistor 12 is kept turned off in the ordinary operation so that sub-transistor 12 is free from the supply and/or cut-off of high voltage 42 V via second input terminal 31. Operation of sub-transistor 12 is to be described afterward.

DC-DC converter 3 has low voltage transistor 15 for stepping down high voltage 42 V to a lowered voltage 14 V. More specifically, high voltage 42 V from first input terminal 30 is smoothed by means of a first capacitor 19. Then, low voltage transistor 15 driven (duty control) with a control element 16 steps down the thus smoothed high voltage 42V to lowered voltage 14 V. Herein, lowered voltage 14 V is a predetermined voltage to be supplied to first low voltage load 6A and second low voltage load 6B.

The thus stepped down voltage (lowered voltage 14 V) is then smoothed by means of a second capacitor 20, a choke coil 18, and a diode 17, to be outputted from an output terminal 32.

Second input terminal 31 is disposed between an output side of low voltage transistor 15, and choke coil 18.

Generally, a transistor is known to be used for stepping down a voltage in the following equation:

Output voltage=Input voltage·Duty ratio{=ON period/(ON period+ OFF period)}

Lowered voltage 14 V from output terminal 32 is inputted, by way of output wire B, to first low voltage load 6A and second low voltage load 6B.

On output wire B, there is provided voltage sensor 5 for sensing an output voltage from output terminal 32. Signal sensed with voltage sensor 5 is conveyed to control element 21 by way of signal wire E. Thereafter, based on the signal from voltage sensor 5, control element 21 can control a warning lamp 8 {1. turned ons and offs (flicker). 2. turned off. 3. turned on (lighted up).}.

Open Mode Failure of Low Voltage Transistor 15

Described hereinafter is concerning an open mode failure which may be caused to low voltage transistor 15 in DC-DC converter 3.

The open mode failure may keep low voltage transistor 15 turned off, thus lowering the output voltage of DC-DC converter 3 to 0 V.

Referring to an output signal from voltage sensor 5, control element 21 can continuously monitor the output voltage from DC-DC converter 3.

The voltage supplied to first low voltage load 6A and second low voltage load 6B has an allowable range from 9 V to 16 V. When the supplied voltage is lower than the lower limit of 9 V, control element 21 determines that the open mode failure has occurred to low voltage transistor 15. A time t1 in FIG. 3 indicates a point in time when the supplied voltage becomes lower than the lower limit of 9 V.

Figure 3:
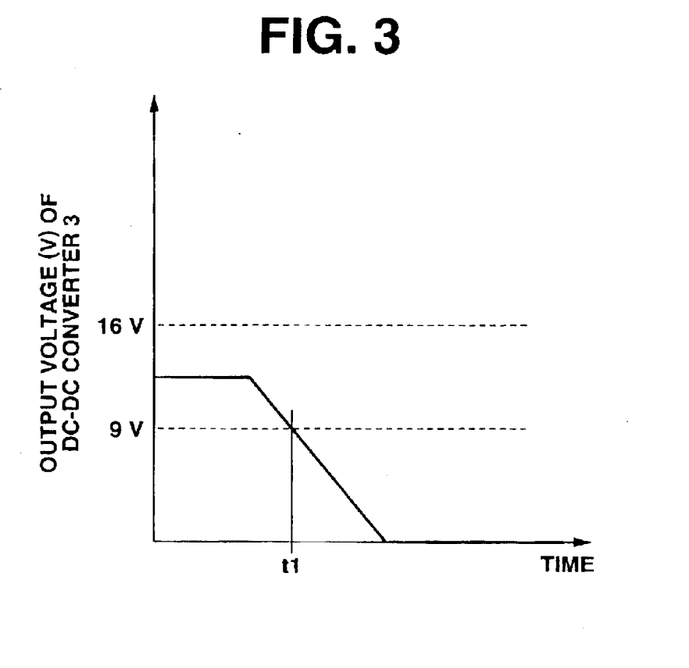
FIG. 3 shows a graph of an output depicted when the DC-DC converter 3 causes an open mode failure.

Once the open mode failures is determined to occur to low voltage transistor 15, control element 21 may drive (duty control) sub-transistor 12 which so far was in condition of being turned off. Thus driven (duty control) sub-transistor 12 can step down the power (having high voltage 42 V conveyed from high voltage wire A), and then supply the thus stepped down power to DC-DC converter 3, by way of sub-power supply wire D and second input terminal 31.

The thus inputted power may then have its voltage smoothed by means of second capacitor 20, diode 17 and choke coil 18, to be outputted from output terminal 32. Herein, the duty ratio for driving sub-transistor 12 is so controlled as to bring about lowered voltage 14 V which is outputted from DC-DC converter 3.

In addition to the open mode failure, low voltage transistor 15 may cause a short mode failure.

Short Mode Failure of Low Voltage Transistor 15

Figure 4:
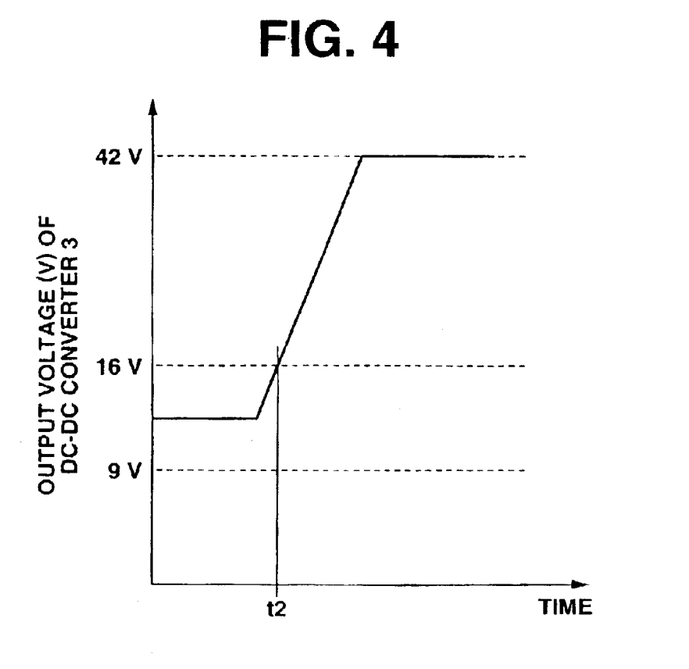
FIG. 4 shows the graph of the output depicted when the DC-DC converter 3 causes a short mode failure.

The short mode failure may keep low voltage transistor 15 turned on, thus disabling low voltage transistor 15 from the switching operation. With this, the output voltage from DC-DC converter 3 may increase to high voltage 42 V which is the input voltage to DC-DC converter 3.

The voltage supplied to first low voltage load 6A and second low voltage load 6B has the allowable range from 9 V to 16 V. When the supplied voltage is higher than the upper limit of 16 V, control element 21 determines that the short mode failure has occurred to low voltage transistor 15. A time t2 in FIG. 4 indicates a point in time when the supplied voltage becomes higher than the upper limit of 16 V.

Once the short mode failure is determined to occur to low voltage transistor 15, control element 21 may turn off main transistor 11. In addition, control element 21 may, like in the open mode failure, drive (duty control) sub-transistor 12 which so far was in condition of being turned off. Thereby, DC-DC converter 3 can output lowered voltage 14 V from output terminal 32.

By turning on (lighting up) warning lamp 8, control element 21 can warn a user of the open mode failure and the short mode failure of low voltage transistor 15.

Flow Chart of Operations by Control Element 21

Figure 5:
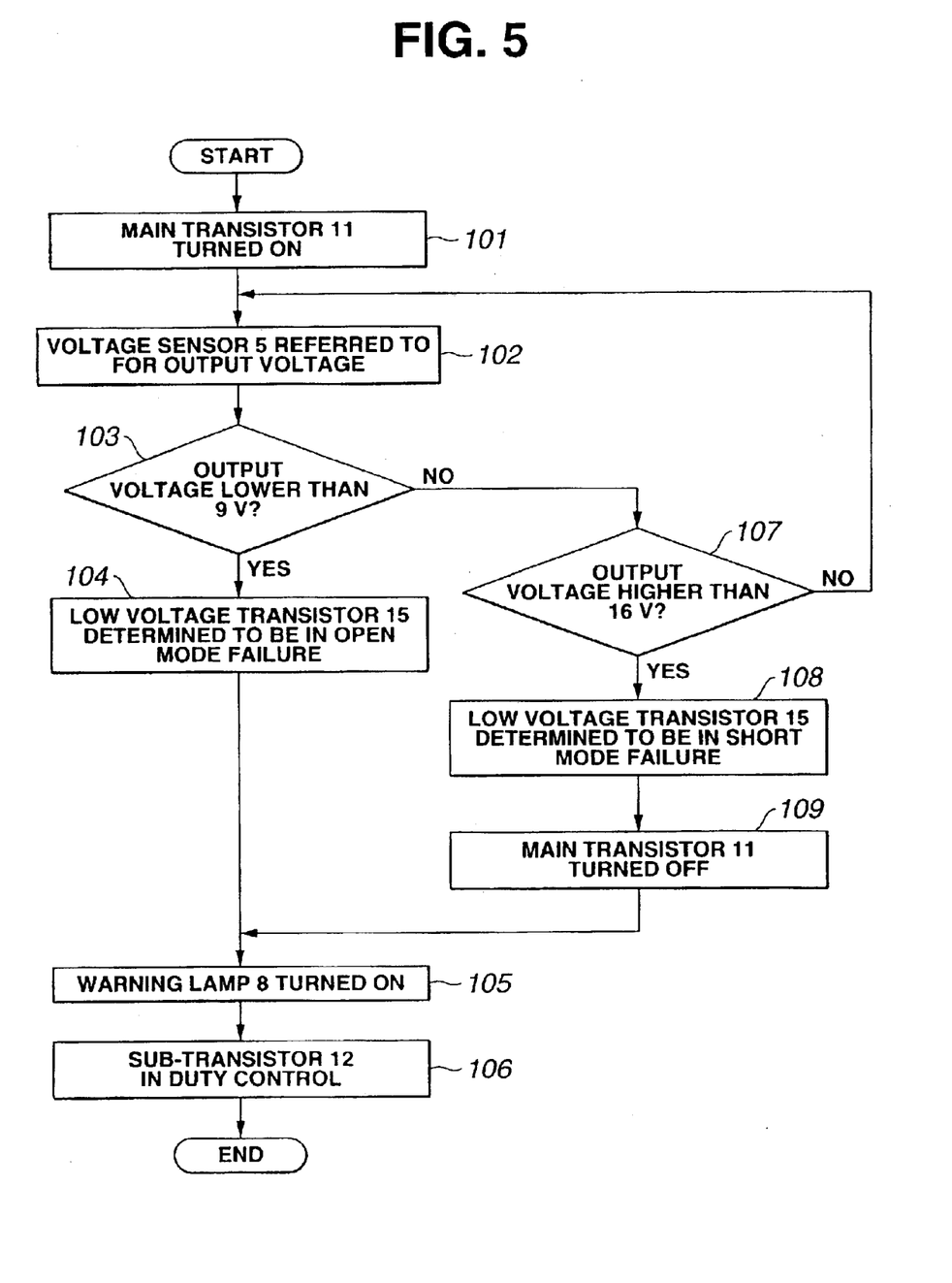
FIG. 5 shows a flow chart of operations by control element 21, according to the first embodiment.

Described hereinafter referring to FIG. 5 is a flow chart of operations by control element 21, according to the first embodiment.

Step 101: Turning on main transistor 11 can supply the power to DC-DC converter 3 by way of main power supply wire C. In DC-DC converter 3, control element 16 drives (duty control) low voltage transistor 15, to thereby output the power (having lowered voltage 14 V) from output terminal 32.

Step 102: Control element 21 refers to voltage sensor 5 for the output voltage.

Step 103: Control element 21 determines whether or not the output voltage sensed with voltage sensor 5 is lower than 9 V.

1. If YES at step 103, the routine proceeds to step 104.
2. If NO at step 103, the routine proceeds to step 107.

Step 104: Control element 21 determines that low voltage transistor 15 in DC-DC converter 3 has caused the open mode failure.

Step 105: Control element 21 turns on (lights up) warning lamp 8, thus warning the user of the open mode failure of low voltage transistor 15 in DC-DC converter 3.

Step 106: Control element 21 drives (duty control) sub-transistor 12 so that the output voltage from DC-DC converter 3 can be equal to lowered voltage 14 V.

In sum, step 103, step 104, step 105 and step 106 can secure the power having lowered voltage to be outputted from first low voltage load 6A and second low voltage load 6B.

The routine may take the other steps as below:

Step 107: Control element 21 determines whether or not the output voltage sensed with voltage sensor 5 is higher than 16 V.

1. If YES at step 107, the routine proceeds to step 108.
2. If NO at step 107, the routine returns to step 102.

Step 108: Control element 21 determines that low voltage transistor 15 in DC-DC converter 3 has caused the short mode circuit.

Step 109: Control element 21 turns off main transistor 11, to thereby stop supplying the power to DC-DC converter 3 by way of main power supply wire C. Then, the routine proceeds to subsequent step 105 and step 106.

In sum, step 107, step 108, step 109, step 105 and step 106 can stop applying the power (having the voltage higher than 16 V) to first low voltage load 6A and second low voltage load 6B, thus preventing breakage. In addition, driving sub-transistor 12 can supply lowered voltage (proper voltage) continuously.

According to the first embodiment of the present invention, step 101 to step 104 and step 106 to step 109 constitute a controlling means, while step 105 constitutes a warning section.

The multi-voltage power supply system which is equipped with the high voltage system (42 V) and the low voltage system (14 V) according to the first embodiment of the present invention has the construction described above. With the above construction, driving sub-transistor 12 can secure supply of the output voltage to first low voltage load 6A and second low voltage load 6B even when the open mode failure and/or the short mode failure of low voltage transistor 15 may prevent supply of the power (having the lowered voltage) to first low voltage load 6A and second low voltage load 6B.

The above construction of the multi-voltage power supply system according to the first embodiment of the present invention, thereby, can save the need of a low voltage battery like the one that is used (against failures) for the multi-voltage power supply system as disclosed in "Automotive electronics power up" of IEEE SPECTRUM, May 2000. In "Automotive electronics power up" of IEEE SPECTRUM, May 2000, the low voltage battery is referred to as "12-V lead-acid battery" or "12-V battery" mainly on page 35 to page 37.

As a result, the multi-voltage power supply system according to the first embodiment of the present invention can reduce cost and weight equivalent of the low voltage battery.

Moreover, turning off main transistor 11 in the short mode failure of low voltage transistor 15 can prevent supply of the power (having the high voltage) to first low voltage load 6A and second low voltage load 6B.

Still furthermore, checking (diagnosis) for any failure of sub-transistor 12 (which is driven for the switching operation when DC-DC converter 3 is in failure) at a proper timing, such as when the multi-voltage power supply system is turned on, can further increase reliability of the multi-voltage power supply system.

Failure Diagnosis of Sub-transistor 12

Figure 6:
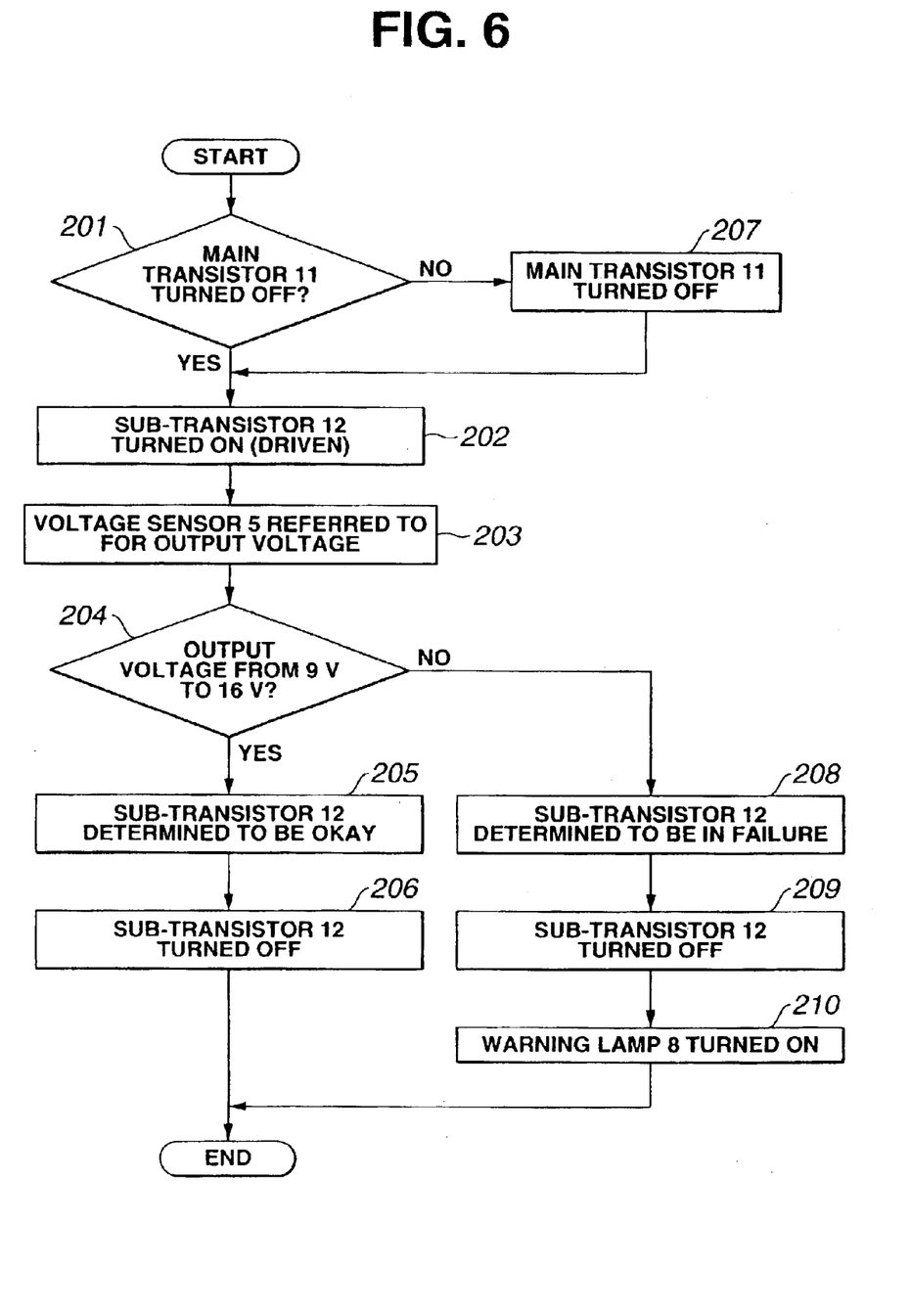
FIG. 6 is a flow chart showing how to carry out a failure diagnosis of a sub-transistor 12.

FIG. 6 shows how control element 21 carries out the failure diagnosis of sub-transistor 12.

Step 201: Control element 21 determines whether or not main transistor 11 is turned off.

1. If YES at step 201, the routine proceeds to step 202.
2. If NO at step 201, the routine proceeds to step 207.

Step 207: Control element 21 turns off main transistor 11. Then, the routine proceeds to step 202.

Step 202: Control element 21 drives sub-transistor 12 (duty control, for example, at the duty ratio of 33%) for the switching operation. Herein, sub-transistor 12 is to be used when DC-DC converter 3 is in failure.

Step 203: Control element 21 refers to voltage sensor 5 for the output voltage.

Step 204: Control element 21 determines whether or not the output voltage sensed with voltage sensor 5 is in the range from 9 V to 16 V.

1. If YES at step 204, the routine proceeds to step 205.
2. If NO at step 204, the routine proceeds to step 208.

Step 205: Control element 21 determines that sub-transistor 12 is okay.

Step 206: Control element 21 turns off sub-transistor 12 to stop the switching operation, thus completing the diagnosis of sub-transistor 12.

The routine may take the other steps as below:

Step 208: On the other hand, control element 21 determines that sub-transistor 12 is in failure.

Step 209: Control element 21 turns off sub-transistor 12 to stop the switching operation.

Step 210: Control element 21 conveys the signal to warning lamp 8, thus turning on (lighting up) the warning lamp 8 for warning the user of the failure of sub-transistor 12. For warning the user of the sub-transistor 12's information, warning lamp 8 is so adjusted as to operate in the following manner:

1) Turned "ons and offs (flicker)" when sub-transistor 12 is being diagnosed.
2) Turned "off" after sub-transistor 12 is determined to be okay.
3) Turned "on (lighted up)" when sub-transistor 12 is determined to be in failure.

Getting sub-transistor 12's information in advance by diagnosing sub-transistor 12 when turning on the power supply system can improve reliability of sub-transistor 12 which is driven when DC-DC converter 3 is in failure.

Figure 7:
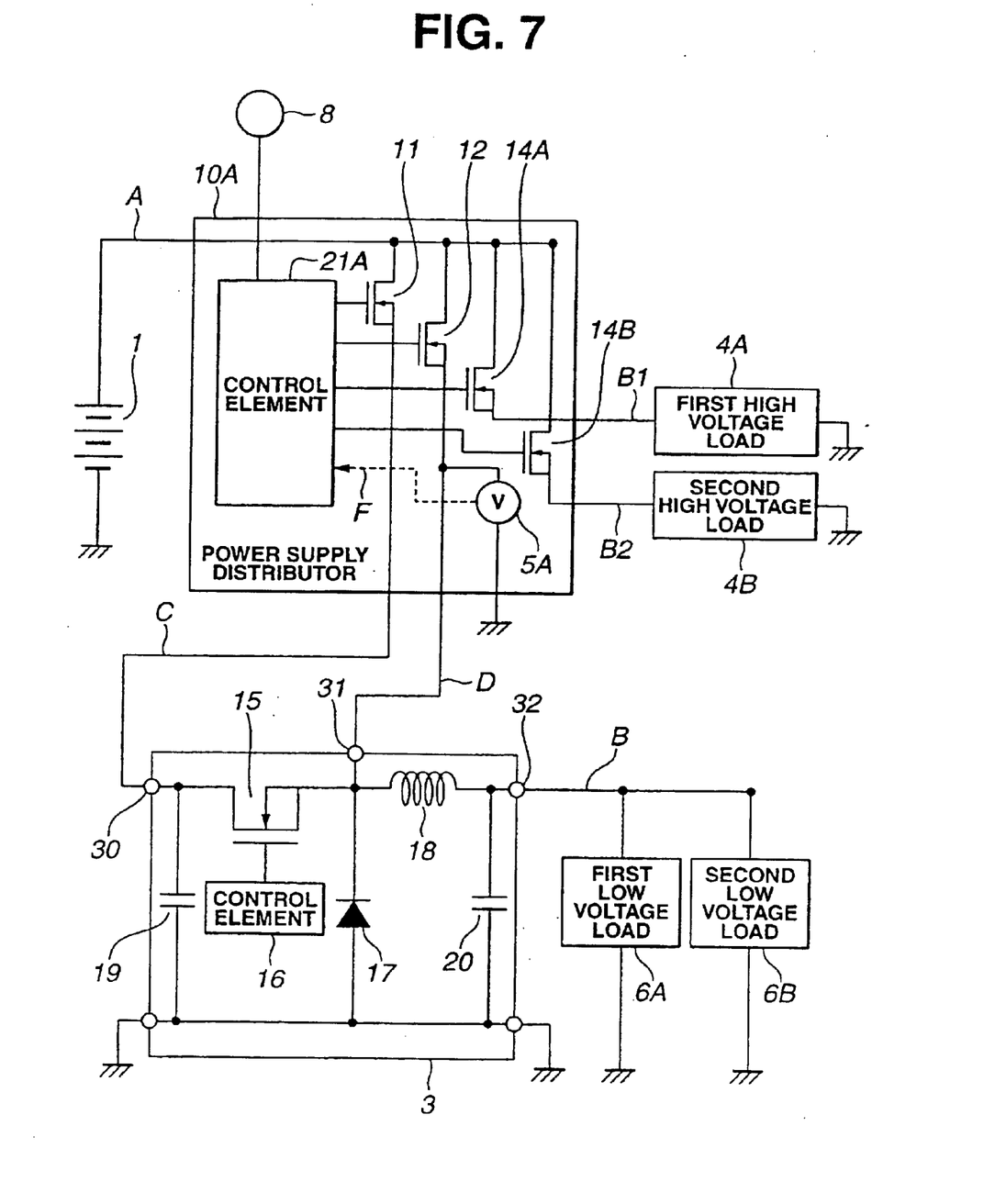
FIG. 7 is a circuit diagram showing a multi-voltage power supply system, according to a second embodiment of the present invention.

As is seen in FIG. 7, there is provided the circuit diagram showing the multi-voltage power supply system which is equipped with the high voltage system (42 V) and the low voltage system (14 V), according to a second embodiment of the present invention.

A voltage sensor 5A according to the second embodiment is disposed in a position different from that of voltage sensor 5 (counterpart of voltage sensor 5A) according to the first embodiment in FIG. 2.

There is provided a power supply distributor 10A. Like power supply distributor 10 according to the first embodiment, power supply distributor 10A according to the second embodiment connects to first high voltage load 4A and second high voltage load 4B. Moreover, power supply distributor 10A connects to DC-DC converter 3, by way of main power supply wire C and sub-power supply wire D. DC-DC converter 3 connects to first low voltage load 6A and second low voltage load 6B by way of output wire B.

In power supply distributor 10A, there is provided the voltage sensor 5A connecting to sub-power supply wire D. Voltage sensor 5A can sense voltage change which may be caused by driving low voltage transistor 15 in duty control. Signal sensed with voltage sensor 5A is inputted to a control element 21A by way of a signal wire F. Referring to the signal from voltage sensor 5A, control element 21A can control main transistor 11 and sub-transistor 12.

The other construction and operation of the multi-voltage power supply system according to the second embodiment are substantially the same as those of the multi-voltage power supply system according to the first embodiment. Therefore, repeated descriptions are omitted.

Short Mode Failure of Low Voltage Transistor 15

The short mode failure caused to low voltage transistor 15 in DC-DC converter 3 may keep low voltage transistor 15 turned on, thus disabling low voltage transistor 15 from the switching operation.

Figure 8:
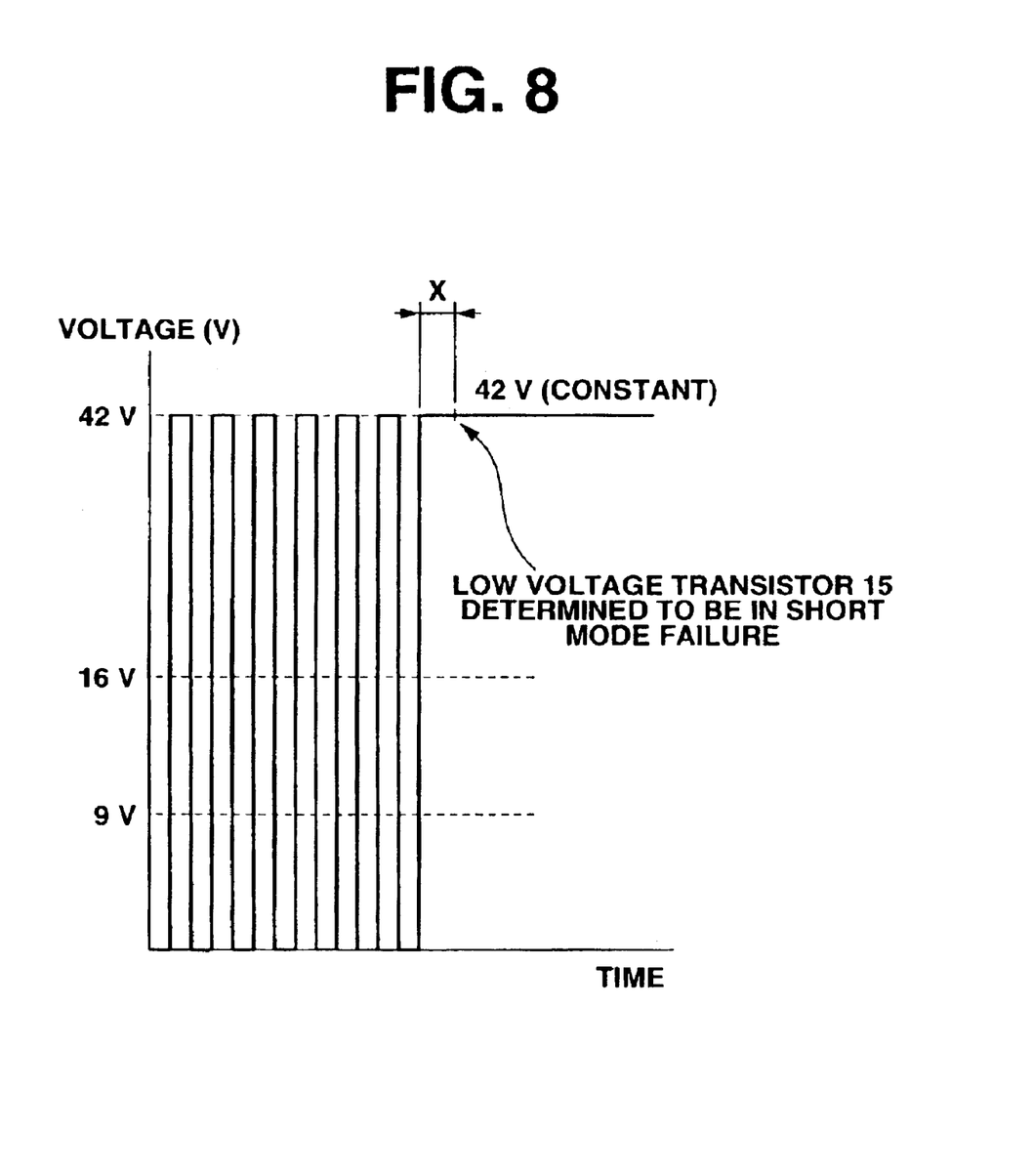
FIG. 8 shows a graph depicting an output of a low voltage transistor 15 in a short mode failure.

With this, voltage sensor 5A senses the input voltage (high voltage 42 V) of DC-DC converter 3 showing no change (constant), as is seen in FIG. 8. The sensed signal can be inputted to control element 21A by way of signal wire F. If high voltage 42 V sensed with voltage sensor 5A continues for at least a predetermined time X, control element 21A determines that low voltage transistor 15 has caused the short mode failure.

Predetermined time X can be set, for example, in the following manner:

Shorter than a single ON-and-OFF period of low voltage transistor 15, and longer than an ON period of low voltage transistor 15.

Open Mode Failure of Low Voltage Transistor 15

Figure 9:
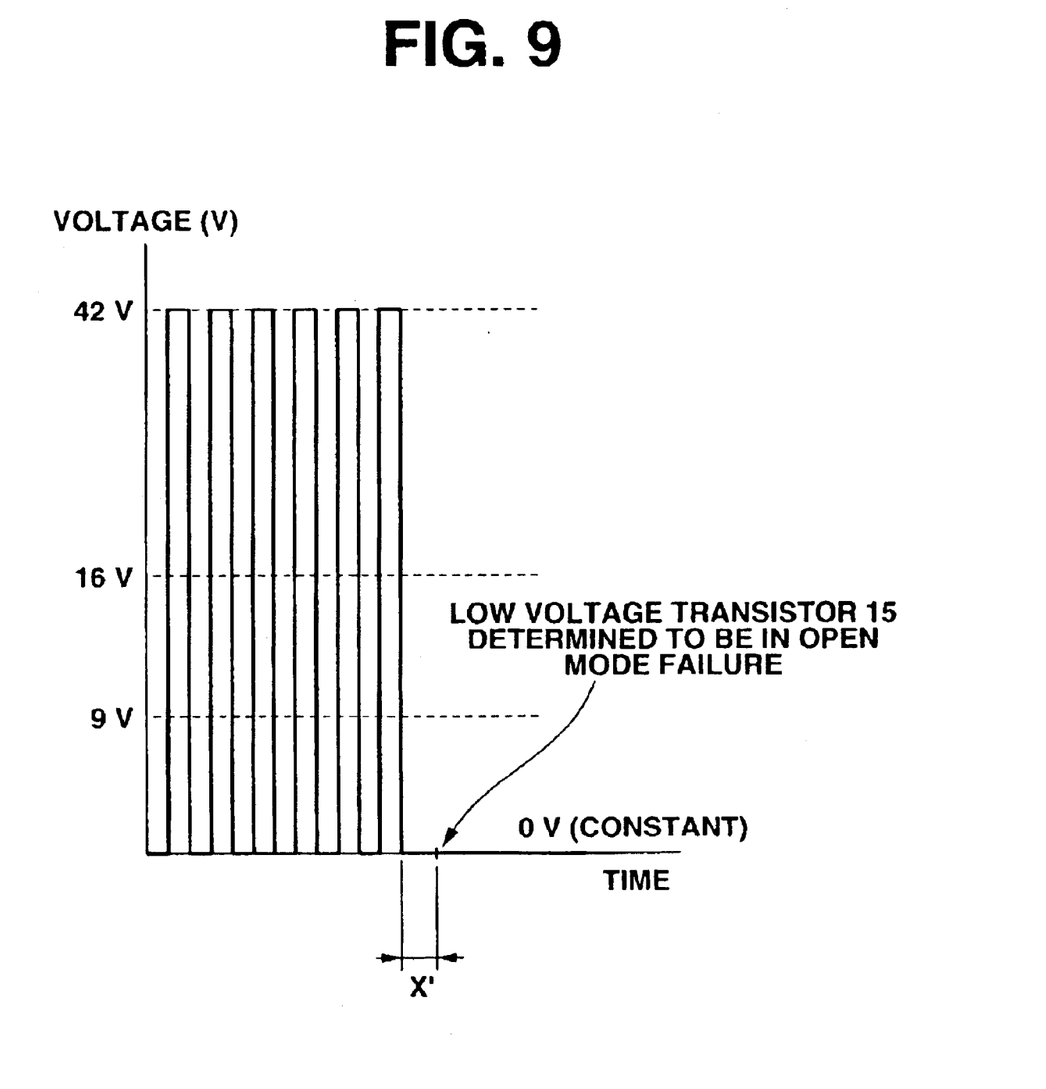
FIG. 9 shows a graph depicting the output of the low voltage transistor 15 in an open mode failure.

On the other hand, the open mode failure caused to low voltage transistor 15 in DC-DC converter 3 may keep low voltage transistor 15 turned off, thus disabling low voltage transistor 15 from the switching operation.

With this, voltage sensor 5A senses voltage 0 V showing no change (constant), as is seen in FIG. 9. The sensed signal can be inputted to control element 21A by way of signal wire F. If the voltage 0 V sensed with voltage sensor 5A continues for at least a predetermined time X', control element 21A determines that low voltage transistor 15 has caused the open mode failure.

Predetermined time X' can be set, for example, in the following manner:

Shorter than the single ON-and-OFF period of low voltage transistor 15, and longer than an OFF period of low voltage transistor 15.

Flow Chart of Operations by Control Element 21A

Figure 10:
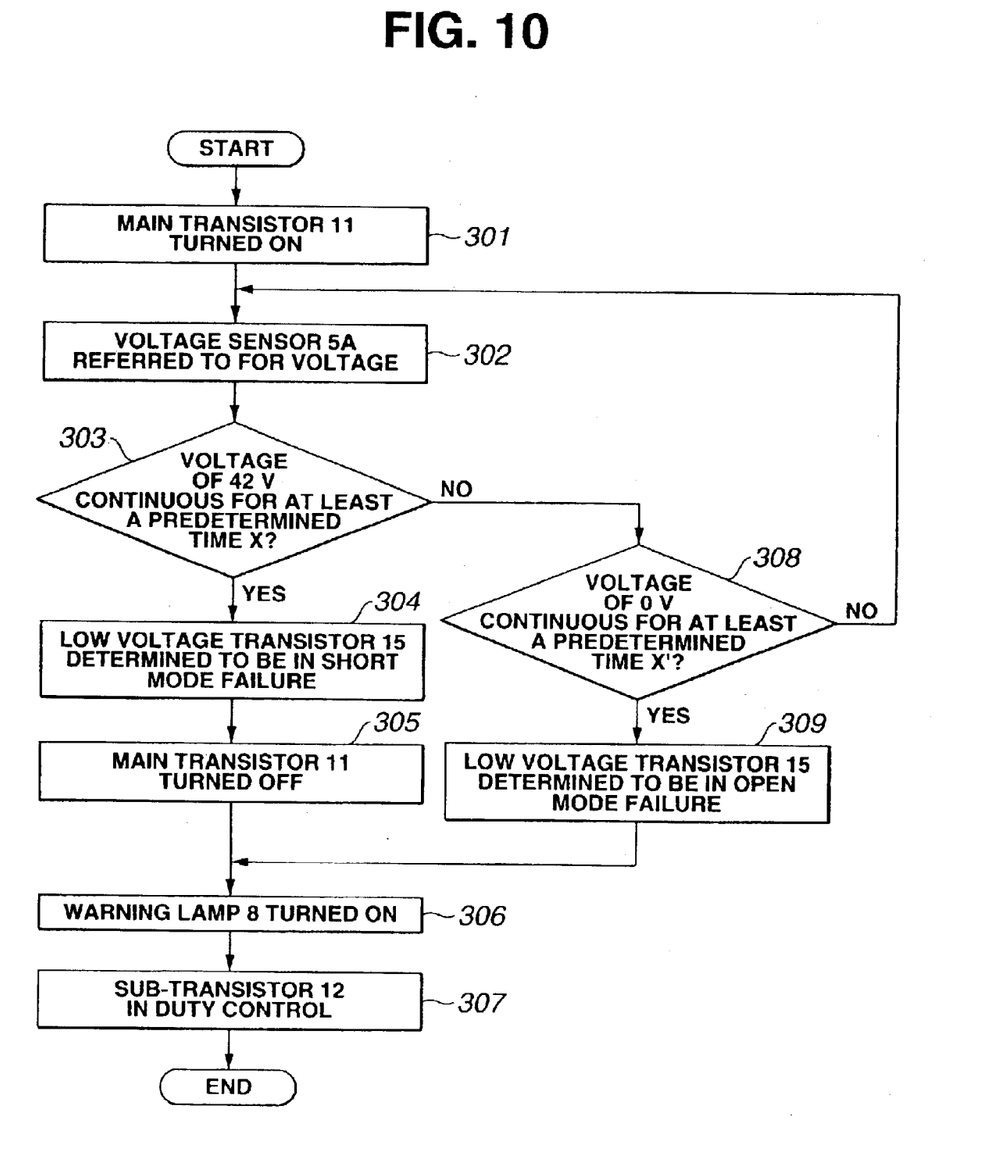
FIG. 10 shows a flow chart of operations by a control element 21A, according to the second embodiment.

Described hereinafter referring to FIG. 10 is a flow chart of operations by control element 21A, according to the second embodiment.

Step 301: Control element 21A turns on main transistor 11, to thereby input the power (having high voltage 42 V) to DC-DC converter 3 by way of main power supply wire C. Driving low voltage transistor 15 can step down high voltage 42 V of the thus inputted power to lowered voltage 14V.

Step 302: Control element 21A refers to voltage sensor 5A for the voltage.

Step 303: Control element 21A determines whether or not high voltage 42 V continues for at least predetermined time X.

If YES at step 303, the routine proceeds to step 304.
If NO at step 303, the routine proceeds to step 308.

Step 304: Control element 21A determines that low voltage transistor 15 in DC-DC converter 3 has caused the short mode failure.

Step 305: Control element 21A turns off main transistor 11, thus stopping the supply of the power to DC-DC converter 3.

Step 306: Control element 21A turns on (lights up) warning lamp 8, warning the user of the short mode failure of low voltage transistor 15.

Step 307: Control element 21A drives (duty control) sub-transistor 12 so that the output voltage can be securely supplied to first low voltage load 6A and second low voltage load 6B.

The routine may take the other steps as below:

Step 308: Control element 21A determines whether or not voltage 0 V continues for at least predetermined time X'.

If YES at step 308, the routine proceeds to step 309.

If NO at step 308, the routine returns to step 302.

Step 309: Control element 21A determines that low voltage transistor 15 in DC-DC converter 3 has caused the open mode failure. Then, the routine proceeds to the subsequent step 306 and step 307.

The above operations of control element 21A can be summarized as below:

By sensing the change in the voltage (applied to low voltage transistor 15) by way of sub-power supply wire D, control element 21A can determine the short mode failure and/or open mode failure which may be caused to low voltage transistor 15.

The above constructions of the multi-voltage power supply system according to the second embodiment of the present invention can bring about the following effects:

Even when low voltage transistor 15 may cause the short mode failure and/or the open mode failure which are responsible for stoppage of power supply to first low voltage load 6A and second low voltage load 6B, allowing sub-transistor 12 to supply the power to DC-DC converter 3 can securely supply the power (having the lowered voltage) to first low voltage load 6A and second low voltage load 6B.

Moreover, the following feature of the multi-voltage power supply system according to the second embodiment of the present invention can contribute to shortening signal wire F between voltage sensor 5A and control element 21A:

The open mode failure and/or the short mode failure of low voltage transistor 15 is determined based on a switching waveform (of the voltage) which is obtained when low voltage transistor 15 is driven. In addition, voltage sensor 5A sensing the voltage is incorporated in power supply distributor 10A.

Although the present invention has been described above by reference to certain embodiments, the present invention is not limited to the embodiments described above. Modifications and variations of the embodiments described above will occur to those skilled in the art, in light of the above teachings.

According to the first embodiment of the present invention, when the short mode failure is caused to low voltage transistor 15, it is sub-transistor 12 that is driven in duty control for supplying the power {having lowered voltage} to first low voltage load 6A and second low voltage load 6B. The present invention is, however, not limited to the above. Main transistor 11 can replace sub-transistor 12 to be driven in duty control for stepping down high voltage from high voltage power supply 1 so that lowered voltage can be outputted to first low voltage load 6A and second low voltage load 6B.

Moreover, according to each of the first embodiment and the second embodiment of the present invention, the number of high voltage loads is two. More specifically, first high voltage load 4A and second high voltage load 4B according to the first embodiment connect to power supply distributor 10, while first high voltage load 4A and second high voltage load 4B according to the second embodiment connect to power supply distributor 10A. The number of high voltage loads is, however, not limited to two. The number of high voltage loads can be determined on a case-by-case basis.

In terms of the number, the same can hold true to first low voltage load 6A and second low voltage load 6B connecting to DC-DC converter 3. In other words, the number of low voltage loads can be determined on a case-by-case basis.

Moreover, the transistor used as the switching element can be replaced with other devices.

Still furthermore, the method of diagnosing sub-transistor 12 is not limited to the one shown in FIG. 6. The following method is replaceable:

Drive (duty control: sweep increased, for example, from 25% to 40%) sub-transistor 12 with main transistor 11 turned off, and determine whether or not sweep voltage outputted from DC-DC converter 3 is increased, for example, from 9 V to 16 V.

The present application is based on a prior Japanese Patent Application No. P2002-005118 (filed on Jan. 11, 2002 in Japan). The entire contents of the Japanese Patent Application No. P2002-005118 is incorporated herein by reference, in order to take some protection against mistranslation or omitted portions.

The scope of the present invention is defined with reference to the following claims.

What is claimed is:

1. A power supply system comprising:
   1) a high voltage power supply for supplying a power having a high voltage;
   2) a main power supply wire connecting to the high voltage power supply;
   3) a step down circuit comprising the following operations:
      a) inputting, by way of the main power supply wire, the power having the high voltage,
      b) stepping down the thus inputted power having the high voltage, and
      c) outputting a power having a lowered voltage lower than the high voltage, a first predetermined voltage being defined lower than the lowered voltage stepped down by the step down circuit;
   4) a sub-power supply wire connecting the high voltage power supply to an output side of the step down circuit;
   5) a voltage sensor for sensing a voltage of the power outputted from the step down circuit;
   6) a sub-switching element disposed on the sub-power supply wire; and
   7) a controller for controlling the sub-switching element,
      a) the controller turning off the sub-switching element, when the voltage sensed with the voltage sensor is equal to or higher than the first predetermined voltage; and
      b) the controller driving the sub-switching element in duty control for stepping down the power having the high voltage to the power having the lowered voltage outputted from the step down circuit, when the voltage sensed with the voltage sensor is lower than the first predetermined voltage.

2. The power supply system as claimed in claim 1, wherein
   the power supply system includes a warning section to give a warning to a user, and
   the controller outputs a signal by referring to the voltage sensed with the voltage sensor, to thereby give the warning to the user.

3. The power supply system as claimed in claim 1, wherein
   the power supply system includes a warning section to give a warning to a user,
   the controller drives the sub-switching element at a predetermined duty ratio, and carries out a diagnosis of a failure of the sub-switching element by referring to the voltage sensed with the voltage sensor, and when the diagnosis determines that the sub-switching element has the failure, the controller outputs a signal to the warning section, to thereby give the warning to the user.

4. The power supply system as claimed in claim 3, wherein the diagnosis of the sub-switching element is carried out when the power supply system is turned on.

5. The power supply system as claimed in claim 1, wherein the step down circuit includes a switching element which is so driven in duty control as to change the power having the high voltage to the power having the lowered voltage, the sub-power supply wire connects to an output end of the switching element of the step down circuit, the voltage sensor connects to the sub-power supply wire, the controller controls the main switching element and the sub-switching element by referring to a voltage of the sub-power wire which is sensed with the voltage sensor connecting to the sub-power supply wire, and the step down circuit is a DC-DC converter, the sub-switching element is a transistor, and the switching element is a transistor.

6. A power supply process comprising:

1) supplying, from a high voltage power supply, a power having a high voltage;

2) stepping down the power having the high voltage, the stepping down operation by a step down circuit comprising the following operations:
   a) inputting, by way of a main power supply wire connecting to the high voltage power supply, the power having the high voltage,
   b) stepping down the thus inputted power having the high voltage, and
   c) outputting a power having a lowered voltage lower than the high voltage, a first predetermined voltage being defined lower than the lowered voltage thus stepped down;

3) sensing a voltage of the power outputted from the step down circuit; and 4) controlling a sub-switching element disposed on a sub-power supply wire which connects the high voltage power supply to an output side of the step down circuit, the controlling operation comprising the following operations:
   a) turning off the sub-switching element, when the voltage thus sensed is equal to or higher than the first predetermined voltage; and
   b) driving the sub-switching element in duty control for stepping down the power having the high voltage to the power having the lowered voltage outputted from the step down circuit, when the voltage thus sensed is lower than the first predetermined voltage.

7. A power supply system comprising:

1) a supplying means for supplying a power having a high voltage;

2) a first connecting means connecting to the high voltage power supply;

3) a stepping down means comprising the following operations:
   a) inputting, by way of the first connecting means, the power having the high voltage,
   b) stepping down the thus inputted power having the high voltage, and
   c) outputting a power having a lowered voltage lower than the high voltage, a first predetermined voltage being defined lower than the lowered voltage stepped down by the stepping down means;

4) a second connecting means connecting the high voltage power supply to an output side of the stepping down means;

5) a sensing means for sensing a voltage of the power outputted from the stepping down means;

6) a sub-switching means disposed on the second connecting means; and 7) a controlling means for controlling the sub-switching means,
   a) the controlling means turning off the sub-switching means, when the voltage sensed with the sensing means is equal to or higher than the first predetermined voltage; and
   b) the controlling means driving the sub-switching means in duty control for stepping down the power having the high voltage to the power having the lowered voltage outputted from the stepping down means, when the voltage sensed with the sensing means is lower than the first predetermined voltage.

8. A power supply system comprising:

1) a high voltage power supply for supplying a power having a high voltage;

2) a main power supply wire connecting to the high voltage power supply;

3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a first predetermined voltage being defined lower than the lowered voltage stepped down by the step down circuit, a second predetermined voltage being defined higher than the lowered voltage stepped down by the step down circuit;

4) a sub-power supply wire connecting the high voltage power supply to an output side of the step down circuit;

5) a voltage sensor for sensing a voltage of the power outputted from the step down circuit;

6) a main switching element disposed on the main power supply wire;

7) a sub-switching element disposed on the sub-power supply wire; and 8) a controller for controlling the main switching element and the sub-switching element,
   a) the controller turning on the main switching element while the controller turning off the sub-switching element, when the voltage sensed with the voltage sensor is in both of the following states:
      i) equal to or lower than the second predetermined voltage, and
      ii) equal to or higher than the first predetermined voltage;
   b) the controller driving the main switching element in duty control for stepping down the power having the high voltage to the power having the lowered voltage outputted from the step down circuit, when the voltage sensed with the voltage sensor is higher than the second predetermined voltage; and c) the controller driving the sub-switching element in duty control for stepping down the power having the high voltage to the power having the lowered voltage outputted from the step down circuit, when the voltage sensed with the voltage sensor is lower than the first predetermined voltage.

9. The power supply system as claimed in claim 8, wherein the power supply system includes a warning section to give a warning to a user, and the controller outputs a signal by referring to the voltage sensed with the voltage sensor, to thereby give the warning to the user.

10. The power supply system as claimed in claim 8, wherein the power supply system includes a warning section to give a warning to a user, the controller drives the sub-switching element at a predetermined duty ratio, and carries out a diagnosis of a failure of the sub-switching element by referring to the voltage sensed with the voltage sensor, and when the diagnosis determines that the sub-switching element has the failure, the controller outputs a signal to the warning section, to thereby give the warning to the user.

11. The power supply system as claimed in claim 10, wherein the diagnosis of the sub-switching element is carried out when the power supply system is turned on.

12. The power supply system as claimed in claim 8, wherein the step down circuit includes a switching element which is so driven in duty control as to change the power having the high voltage to the power having the lowered voltage, the sub-power supply wire connects to an output end of the switching element of the step down circuit, the voltage sensor connects to the sub-power supply wire, the controller controls the main switching element and the sub-switching element by referring to a voltage of the sub-power wire which is sensed with the voltage sensor connecting to the sub-power supply wire, and the step down circuit is a DC-DC converter, the main switching element is a transistor, the sub-switching element is a transistor, and the switching element is a transistor.

13. A power supply system comprising:
1) a high voltage power supply for supplying a power having a high voltage;
2) a main power supply wire connecting to the high voltage power supply;
3) a step down circuit comprising the following operations:
    a) inputting, by way of the main power supply wire, the power having the high voltage,
    b) stepping down the thus inputted power having the high voltage, and
    c) outputting a power having a lowered voltage lower than the high voltage, a first predetermined voltage being defined lower than the lowered voltage stepped down by the step down circuit, a second predetermined voltage being defined higher than the lowered voltage stepped down by the step down circuit;
4) a sub-power supply wire connecting the high voltage power supply to an output side of the step down circuit;
5) a voltage sensor for sensing a voltage of the power outputted from the step down circuit;
6) a main switching element disposed on the main power supply wire;
7) a sub-switching element disposed on the sub-power supply wire; and
8) a controller for controlling the main switching element and the sub-switching element,
    a) the controller turning on the main switching element while the controller turning off the sub-switching element, when the voltage sensed with the voltage sensor is in both of the following states:
        i) equal to or lower than the second predetermined voltage, and
        ii) equal to or higher than the first predetermined voltage; and
    b) the controller turning off the main switching element while the controller driving the sub-switching element in duty control for stepping down the power having the high voltage to the power having the lowered voltage outputted from the step down circuit, when the voltage sensed with the voltage sensor is in at least one of the following states:
        i) higher than the second predetermined voltage, and
        ii) lower than the first predetermined voltage.

14. The power supply system as claimed in claim 13, wherein the power supply system includes a warning section to give a warning to a user, and the controller outputs a signal by referring to the voltage sensed with the voltage sensor, to thereby give the warning to the user.

15. The power supply system as claimed in claim 13, wherein the power supply system includes a warning section to give a warning to a user, the controller drives the sub-switching element at a predetermined duty ratio, and carries out a diagnosis of a failure of the sub-switching element by referring to the voltage sensed with the voltage sensor, and when the diagnosis determines that the sub-switching element has the failure, the controller outputs a signal to the warning section, to thereby give the warning to the user.

16. The power supply system as claimed in claim 15, wherein the diagnosis of the sub-switching element is carried out when the power supply system is turned on.

17. The power supply system as claimed in claim 13, wherein the step down circuit includes a switching element which is so driven in duty control as to change the power having the high voltage to the power having the lowered voltage, the sub-power supply wire connects to an output end of the switching element of the step down circuit, the voltage sensor connects to the sub-power supply wire, the controller controls the main switching element and the sub-switching element by referring to a voltage of the sub-power wire which is sensed with the voltage sensor connecting to the sub-power supply wire, and the step down circuit is a DC-DC converter, the main switching element is a transistor, the sub-switching element is a transistor, and the switching element is a transistor.

18. A power supply system comprising:

1) a high voltage power supply for supplying a power having a high voltage;
2) a main power supply wire connecting to the high voltage power supply;
3) a step down circuit comprising the following operations:
   a) inputting, by way of the main power supply wire, the power having the high voltage,
   b) stepping down the thus inputted power having the high voltage, and
   c) outputting a power having a lowered voltage lower than the high voltage, a second predetermined voltage being defined higher than the lowered voltage stepped down by the step down circuit;
4) a voltage sensor for sensing a voltage of the power outputted from the step down circuit;
5) a main switching element disposed on the main power supply wire; and
6) a controller for controlling the main switching element, the controller driving the main switching element in duty control for stepping down the power having the high voltage to the power having the lowered voltage outputted from the step down circuit, when the voltage sensed with the voltage sensor is higher than the second predetermined voltage.

19. The power supply system as claimed in claim 18, wherein the power supply system includes a warning section to give a warning to a user, and the controller outputs a signal by referring to the voltage sensed with the voltage sensor, to thereby give the warning to the user.

20. The power supply system as claimed in claim 18, wherein the step down circuit is a DC-DC converter, and the main switching element is a transistor.

* * * * *